Figure 1:
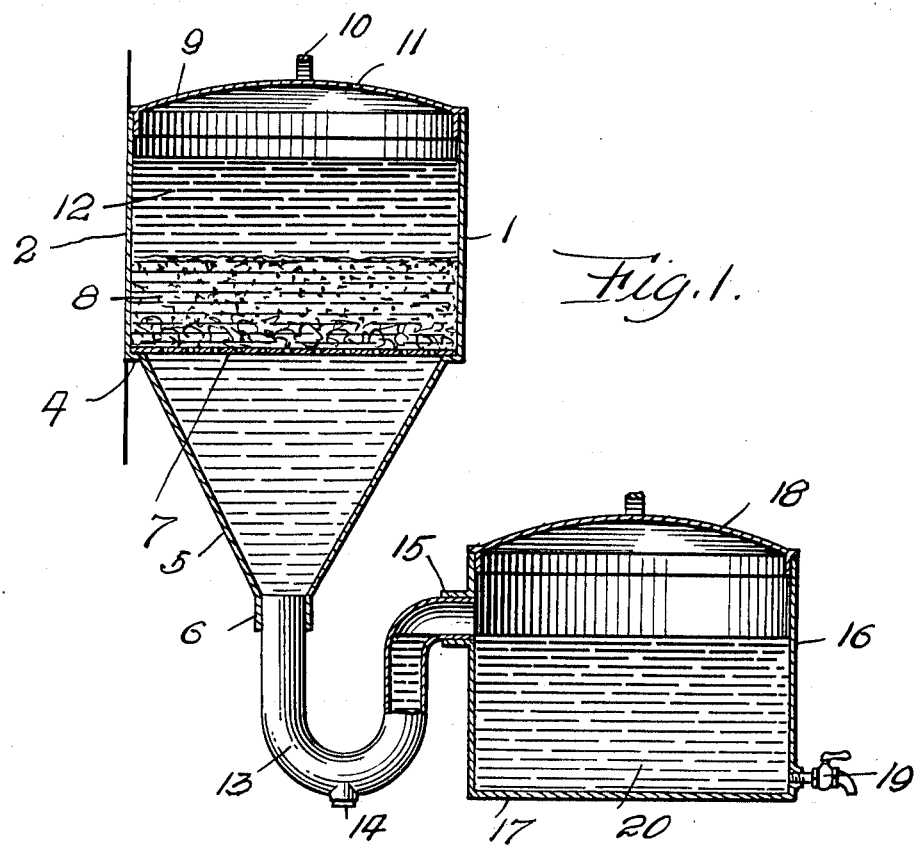

B. JÓZSEF.
FILTERING APPARATUS.
APPLICATION FILED DEC. 4, 1911.

1,020,986. Patented Mar. 26, 1912.

WITNESSES

INVENTOR
Blanár József
BY
ATTORNEYS

UNITED STATES PATENT OFFICE.

BLANÁR JÓZSEF, OF BUFFALO, NEW YORK.

FILTERING APPARATUS.

1,020,986.   Specification of Letters Patent.   Patented Mar. 26, 1912.

Application filed December 4, 1911. Serial No. 663,668.

*To all whom it may concern:*

Be it known that I, BLANÁR JÓZSEF, a subject of the King of Hungary, residing at Buffalo, in the county of Erie and State of New York, have invented certain new and useful Improvements in Filtering Apparatus, of which the following is a specification, reference being had therein to the accompanying drawing.

This invention relates to a filtering apparatus, and the objects of my invention are first, to provide an apparatus that can be secured to a wall or support to permit of the filtered water being easily obtained for drinking purposes; second, to provide a filtering apparatus that can be easily flushed, cleaned and maintained in a sanitary condition; third, to provide a filtering apparatus that will contain a predetermined quantity of filtered water for instant use, and fourth, to accomplish the above results by a mechanical construction that is simple, durable and inexpensive to manufacture.

Figure 2:
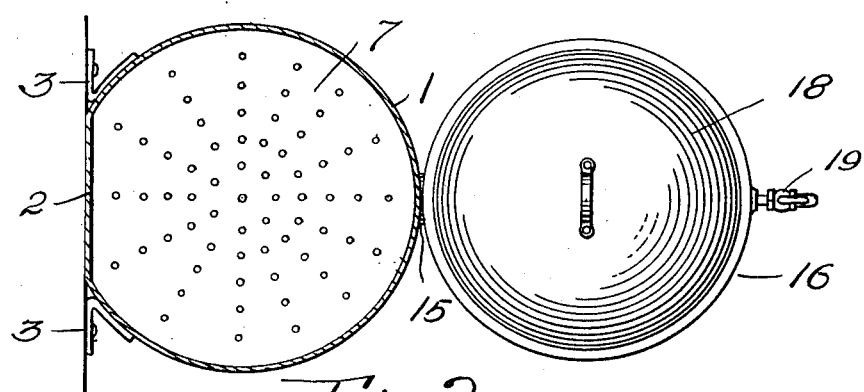

I attain the above objects by a mechanical construction that will be hereinafter specifically described and then claimed, and reference will now be had to the drawing, wherein:

Figure 1 is a vertical sectional view of the filtering apparatus, and Fig. 2 is a plan of the same, with the lid or cover of the filtering receptacle removed.

A filtering apparatus in accordance with this invention consists of a filtering receptacle, a reservoir, and a cleaning or connecting neck that conveys filtered water from the filtering receptacle to the reservoir.

The filtering receptacle comprises a shell 1 having a flat side wall 2 adapted to fit against a wall or other support, said shell being suitably secured to the support. As an instance of the fastening means, straps 3 can be employed, said straps being secured or soldered to the shell 1 and secured to the support by nails or other fastening means.

The lower edges of the shell 1 are provided with an annular inwardly projecting shoulder 4 and formed integral with said shoulder is a depending funnel-shaped outlet 5, said funnel-shaped outlet terminating in a spout 6. Arranged upon the shoulder 4, within the shell 1, is a circular perforated or foraminous plate 7 and this plate supports a filtering material 8 within the shell 1. The filtering material is granular and preferably in the form of sand, charcoal or other well known granular filtering material.

Fitted in the upper end of the shell 1 is a lid or cover 9 having a suitable handle 10. This lid or cover is provided with an opening 11 adjacent to the handle 10, whereby air will be admitted to the upper part of the shell 1, above the unfiltered water 12 within said shell.

Mounted in the spout 6 is one end of a cleaning connection 13 in the form of a gooseneck, said connection having the bottom thereof provided with a detachable plug or cap 14, whereby said connection can be flushed and thoroughly cleaned. Mounted upon the opposite end of the connection 13 is a spout 15 carried by the side wall 16 of a cylindrical reservoir 17. The spout 15 is located adjacent to the upper edges of the reservoir, and these upper edges support a lid or cover 18. The spout 6 of the reservoir, adjacent to the bottom therof, is provided with a spigot or faucet 19, said spigot or faucet being of the ordinary and well known type, whereby the filtered water 20 within the reservoir can be drawn off.

My invention is not limited to the filtering material to be used in the filtering receptacle 1, nor to the size or material from which the apparatus can be made.

What I claim is:—

A filtering apparatus comprising a receptacle having a flat wall adapted to be secured to a suitable support, an annular inwardly projecting shoulder carried by the lower end of said receptacle and having a funnel-shaped outlet, a perforated plate arranged within said receptacle upon said shoulder, filtering material supported by said perforated plate, a cover fitted upon the upper edges of said receptacle and provided with an air inlet opening, a cleaning gooseneck connection carried by the funnel-shaped outlet of said receptacle, a detachable plug carried by the lower end of said connection, a reservoir having a wall thereof provided with a spout fitting upon said cleaning connection, a faucet carried by said reservoir adjacent to the bottom thereof, and a cover snugly fitted upon the upper edges of said reservoir.

In testimony whereof I affix my signature in the presence of two witnesses.

BLANÁR JÓZSEF.

Witnesses:
JOHN J. KORAUS,
LOUIS ZUEHLKE.

Copies of this patent may be obtained for five cents each, by addressing the "Commissioner of Patents, Washington, D. C."